US010749693B2

(12) United States Patent
Papas

(10) Patent No.: US 10,749,693 B2
(45) Date of Patent: Aug. 18, 2020

(54) METHOD AND SYSTEM FOR FACILITATING USE OF AN ELECTRONICALLY CONTROLLED LOCK

(71) Applicant: RMD INNOVATIONS PTY. LTD., Thornbury, Victoria (AU)

(72) Inventor: Nick Papas, Mount Martha (AU)

(73) Assignee: RMD INNOVATIONS PTY. LTD., Thornbury, Victoria (AU)

( * ) Notice: Subject to any disclaimer, the term of this patent is extended or adjusted under 35 U.S.C. 154(b) by 149 days.

(21) Appl. No.: 15/768,921

(22) PCT Filed: Oct. 21, 2016

(86) PCT No.: PCT/AU2016/095005
§ 371 (c)(1),
(2) Date: Apr. 17, 2018

(87) PCT Pub. No.: WO2017/066849
PCT Pub. Date: Apr. 27, 2017

(65) Prior Publication Data
US 2019/0058601 A1 Feb. 21, 2019

(30) Foreign Application Priority Data
Oct. 21, 2015 (AU) .................................. 2015904329

(51) Int. Cl.
*H04L 9/32* (2006.01)
*G07C 9/00* (2020.01)
(Continued)

(52) U.S. Cl.
CPC .............. *H04L 9/3271* (2013.01); *G07C 9/00* (2013.01); *G07C 9/00174* (2013.01);
(Continued)

(58) Field of Classification Search
CPC ........... G07C 2009/00388; G07C 2009/00404; G07C 2009/00412; G07C 2009/00865;
(Continued)

(56) References Cited

U.S. PATENT DOCUMENTS 4,829,296 A * 5/1989 Clark ................. G07C 9/00309
232/7
6,005,487 A * 12/1999 Hyatt, Jr. .............. H04L 9/3226
340/5.65

(Continued)

OTHER PUBLICATIONS

Search Query Report from IP.com (performed Apr. 8, 2020).*
International Search Report for Application No. PCT/AU2016/095005 dated Jan. 9, 2017 (3 pages).

*Primary Examiner* — Sharon S Lynch
(74) *Attorney, Agent, or Firm* — Michael Best & Friedrich LLP

(57) ABSTRACT

A method for an authorised device to effect unlocking of a lock, the authorised device initially being an unverified device, the method comprising: a lock controller operatively interfaced to the lock communicating to a verified device a lock ID of the lock controller via a local communication channel; the verified device generating encrypted data comprising the lock ID; the verified device communicating the encrypted data to the authorised device via a data communication channel; the authorised device obtaining a decryption key for decrypting the encrypted data; the authorised device determining the lock ID by decrypting the encrypted data using the decryption key; the authorised device generating with the lock ID a response to a challenge by the lock controller; the lock controller determining that the response is a correct response; and in response, the lock controller causing unlocking of the lock.

19 Claims, 9 Drawing Sheets

(51) Int. Cl.
*H04L 9/08* (2006.01)
*H04L 9/14* (2006.01)
*H04L 29/06* (2006.01)
*H04W 12/06* (2009.01)
*H04W 12/08* (2009.01)

(52) U.S. Cl.
CPC ........ *G07C 9/00309* (2013.01); *H04L 9/0869* (2013.01); *H04L 9/14* (2013.01); *H04L 63/0492* (2013.01); *H04W 12/06* (2013.01); *H04W 12/08* (2013.01); *G07C 2009/00388* (2013.01); *G07C 2009/00404* (2013.01); *G07C 2009/00412* (2013.01); *G07C 2009/00865* (2013.01); *G07C 2209/04* (2013.01)

(58) Field of Classification Search
CPC .. G07C 2209/04; G07C 9/00; G07C 9/00174; G07C 9/00309; H04L 63/0492; H04L 9/0869; H04L 9/14; H04L 9/3271; H04W 12/06; H04W 12/0609; H04W 12/08
See application file for complete search history.

(56) References Cited

U.S. PATENT DOCUMENTS

| | | | | |
|---|---|---|---|---|
| 6,329,909 | B1 * | 12/2001 | Siedentop | B60R 25/04 307/10.2 |
| 7,389,530 | B2 * | 6/2008 | Raghunath | H04L 9/0891 726/2 |
| 7,495,543 | B2 * | 2/2009 | Denison | G07C 9/00309 340/5.1 |
| 8,947,200 | B2 * | 2/2015 | Kuenzi | H04W 12/04 340/5.51 |
| 9,024,720 | B2 * | 5/2015 | Bliding | H04W 4/80 340/5.61 |
| 9,258,281 | B2 * | 2/2016 | Metivier | H04L 63/0435 |
| 9,600,949 | B2 * | 3/2017 | Conrad | G07C 9/00309 |
| 9,894,066 | B2 * | 2/2018 | Conrad | H04L 63/102 |
| 10,094,885 | B2 * | 10/2018 | Kalous | G01R 31/392 |
| 10,142,843 | B2 * | 11/2018 | Conrad | G07C 9/00309 |
| 10,262,484 | B2 * | 4/2019 | Conrad | H04W 12/06 |
| 2001/0028298 | A1 * | 10/2001 | Liden | G07C 9/00309 340/5.65 |
| 2002/0180582 | A1 * | 12/2002 | Nielsen | G07C 9/00571 340/5.6 |
| 2004/0205350 | A1 * | 10/2004 | Waterhouse | G07C 9/00571 713/182 |
| 2005/0033962 | A1 * | 2/2005 | Libin | H04L 9/3247 713/170 |
| 2005/0088279 | A1 * | 4/2005 | Denison | G07C 9/00309 340/5.23 |
| 2005/0210283 | A1 * | 9/2005 | Kato | G07C 9/00309 340/5.61 |
| 2006/0072755 | A1 * | 4/2006 | Oskari | G06F 21/35 380/270 |
| 2007/0245369 | A1 * | 10/2007 | Thompson | G07C 9/27 725/30 |
| 2007/0283160 | A1 * | 12/2007 | Steven | G07C 9/27 713/182 |
| 2008/0235516 | A1 * | 9/2008 | Raghunath | H04L 9/3231 713/186 |
| 2009/0136035 | A1 * | 5/2009 | Lee | G07C 9/00309 380/270 |
| 2010/0085160 | A1 * | 4/2010 | Fu | A61N 1/37223 340/10.1 |
| 2010/0176919 | A1 | 7/2010 | Myers et al. | |
| 2012/0222103 | A1 * | 8/2012 | Bliding | H04W 4/80 726/7 |
| 2012/0280783 | A1 | 11/2012 | Gerhardt et al. | |
| 2013/0335193 | A1 | 12/2013 | Hanson et al. | |
| 2014/0022054 | A1 * | 1/2014 | Bliding | E05B 49/00 340/5.61 |
| 2014/0077929 | A1 * | 3/2014 | Dumas | G07C 9/00571 340/5.61 |
| 2014/0195810 | A1 * | 7/2014 | Metivier | H04L 63/0435 713/172 |
| 2014/0282877 | A1 * | 9/2014 | Mahaffey | H04L 63/0853 726/3 |
| 2014/0292481 | A1 * | 10/2014 | Dumas | G07C 9/00174 340/5.61 |
| 2015/0356797 | A1 * | 12/2015 | McBride | G07C 9/29 340/5.61 |
| 2016/0055695 | A1 * | 2/2016 | Saeedi | G07C 9/257 340/5.52 |
| 2018/0106871 | A1 * | 4/2018 | Kalous | G07C 9/00571 |
| 2018/0151013 | A1 * | 5/2018 | Carstens | G07C 9/00182 |

\* cited by examiner

METHOD AND SYSTEM FOR FACILITATING USE OF AN ELECTRONICALLY CONTROLLED LOCK

FIELD OF THE INVENTION

The invention generally relates to a method and system for facilitating use of an electronically controlled lock.

BACKGROUND TO THE INVENTION

Traditional locks, such as those utilised to secure doors, typically require a physical key in order for a user to lock or unlock the lock. A physical key requires a user to take an active action in order to cause the change between locked and unlocked states of the lock. Also, in order to produce new keys suitable for use with the door, physical replicas of the original key must be made. This typically requires the use of specialist equipment and a supply of physical key blanks.

Electronic controllers for locks have been proposed, which are able to selectively lock and/or unlock the lock based on commands received via wireless communication protocols.

SUMMARY OF THE INVENTION

According to an aspect of the present invention, there is provided a method for an authorised device to effect unlocking of a lock, the authorised device initially being an unverified device, the method comprising: a lock controller operatively interfaced to the lock communicating to a verified device a lock ID of the lock controller via a local communication channel; the verified device generating encrypted data comprising the lock ID; the verified device communicating the encrypted data to the authorised device via a data communication channel; the authorised device obtaining a decryption key for decrypting the encrypted data; the authorised device determining the lock ID by decrypting the encrypted data using the decryption key; the authorised device generating with the lock ID a response to a challenge by the lock controller; the lock controller determining that the response is a correct response; and in response, the lock controller causing unlocking of the lock.

According to another aspect of the present invention, there is provided a method for an authorised device to effect unlocking of a lock, the authorised device initially being an unverified device, the method comprising: a lock controller operatively interfaced to the lock communicating to a verified device a lock ID of the lock controller via a local communication channel; the authorised device receiving from the verified device encrypted data comprising the lock ID; the authorised device obtaining a decryption key for decrypting the encrypted data; the authorised device determining the lock ID by decrypting the encrypted data using the decryption key; the authorised device generating with the lock ID a response to a challenge by the lock controller; the lock controller determining that the response is a correct response; and in response, the lock controller causing unlocking of the lock.

The local communication channel may be one of: Bluetooth Low Energy, ZigBee, Z-Wave, or any other suitable local wireless communication protocol. Typically, the local communication channel has a range of less than or equal to approximately 50 metres, preferably approximately 10 metres.

In an embodiment, the lock controller comprises a database, the database configured for storing data entries relating to verified devices. Optionally, the method further comprises the step of storing a data entry within the database associated with the verified device specifying that the verified device has permission to communicate the lock ID to the authorised device. The method may further comprise the step of storing a data entry associated with the authorised device specifying one or more limitations associated with the authorised device, said one or more limitations specifying restrictions on the authorised device effecting unlocking of the lock.

Optionally, the challenge comprises communicating a challenge key comprising a set of vectors, and the response comprises a response key generated from the lock ID in accordance with the challenge key.

Optionally, the method further comprises the steps of: the verified device communicating one or more device parameters of the verified device to the authorised device via the data communication channel; the authorised device communicating the one or more device parameters of the verified device to the lock controller via the local communication channel; and the lock controller determining that the one or more device parameters are associated with a verified device entitled to communicate the lock ID. The one or more device parameters of the verified device may be encrypted using a secondary encryption key by the verified device, and the method may further comprise the step of the lock controller decrypting the one or more device parameters using a secondary decryption key.

In an embodiment, the encrypted data is communicated concealed within a pre-generated image to the communication device, preferably via MMS, using a steganographic technique.

The authorised device may obtain the decryption key from the lock controller via the local communication channel. Alternatively, the authorised device may determine two or more parameters related to the encrypted data, and obtains the decryption key by combining the two or more parameters. Optionally, at least one parameter is a public ID of the lock controller and wherein at least one other parameter is a verified device parameter associated with the verified device and/or an unverified device parameter associated with the authorised device. Optionally, the parameters include a public ID of the lock controller, a verified device parameter associated with the verified device, and an unverified device parameter associated with the authorised device.

According to another aspect of the present invention, there is provided a method of a lock controller operating a lock in response to communication with an authorised device, the authorised device initially being an unverified device, the method comprising the lock controller: communicating to a verified device a lock ID of the lock controller via a local wireless communication channel; communicating a challenge comprising a challenge key to the authorised device after the authorised device has obtained the lock ID from the verified device; receiving from the authorised device a response to the challenge generated in accordance with the lock ID and the challenge key, the response comprising a response key; determining that the response is a correct response by comparing the response key to a comparison key generated by the lock controller; in response, operating the lock.

According to another aspect of the present invention, there is provided a method of an authorised device effecting unlocking of a lock, the authorised device initially being an unverified device, the method comprising: receiving at the authorised device encrypted data from a verified device via a data communication channel, the encrypted data comprising the lock ID; the authorised device obtaining a decryption key for decrypting the encrypted data; the authorised device determining the lock ID by decrypting the encrypted data using the decryption key; the authorised device generating in accordance with the lock ID a response to a challenge by the lock controller; and the authorised device communicating the response to the lock controller.

According to another aspect of the present invention, there is provided a locking system comprising: a plurality of authorised devices comprising: one or more verified devices and one or more unverified devices, and a lock controller operatively interfaced with a lock and configured to cause unlocking of the lock, wherein the authorised devices are configured for communication with the lock controller via a local communication channel and wherein the authorised devices are configured for communicating with one another via a data communication channel, wherein: at least one verified device is configured to receive a lock ID from the lock controller via the local communication channel; the one or more unverified devices are configured to receive from a verified device having the lock ID encrypted data comprising the lock ID; the one or more unverified devices are configured to: obtain a decryption key and further configured to decrypt received encrypted data to thereby obtain the lock ID; generate a response in accordance with the lock ID and a challenge key received from the lock controller via the local communication channel; and communicate the response to the lock controller; the lock controller configured to identify a correct response when a response is received from a unverified device and in response to cause unlocking of the lock.

According to another aspect of the present invention, there is provided a lock controller operatively interfaced with a lock, the lock controller comprising a processor, a storage memory, and a network interface, and associated with a lock ID, wherein the processor is configured to enable the lock controller to: maintain a database within the storage memory, the database comprising data entries associated with one or more verified devices; receive a first communication from a verified device, and in response, to receive from the verified device one or more device parameters associated with the verified device; and to store within the database a data entry associated with the verified device including the one or more device parameters.

The processor is optionally further configured to enable the lock controller to: communicate to a verified device the lock ID.

The processor may be further configured to enable the lock controller to: randomly generate a challenge key; communicate the challenge comprising a challenge key to a verified device; receive from the verified device a response to the challenge comprising a response key; generate a comparison key in accordance with the lock ID and the challenge key; and to determine whether the comparison key is the same as the response key, and if so, to cause unlocking of the lock.

The processor may be further configured to enable the lock controller to: maintain within the database limitation information for the verified devices; and to determine whether a verified device communicating with the lock controller meets the requirement of an associated limitation, and to only unlock the lock if said requirement is met.

According to yet another aspect of the present invention, there is provided a lock housing comprising the lock and lock controller according to the above aspects.

BRIEF DESCRIPTION OF THE DRAWINGS

In order that the invention may be more clearly understood, embodiments will now be described, by way of example, with reference to the accompanying drawing, in which.

DETAIL DESCRIPTION OF PARTICULAR EMBODIMENTS

Reference to a randomly generated value includes both randomly and pseudo-randomly generated values.

Figure 1:
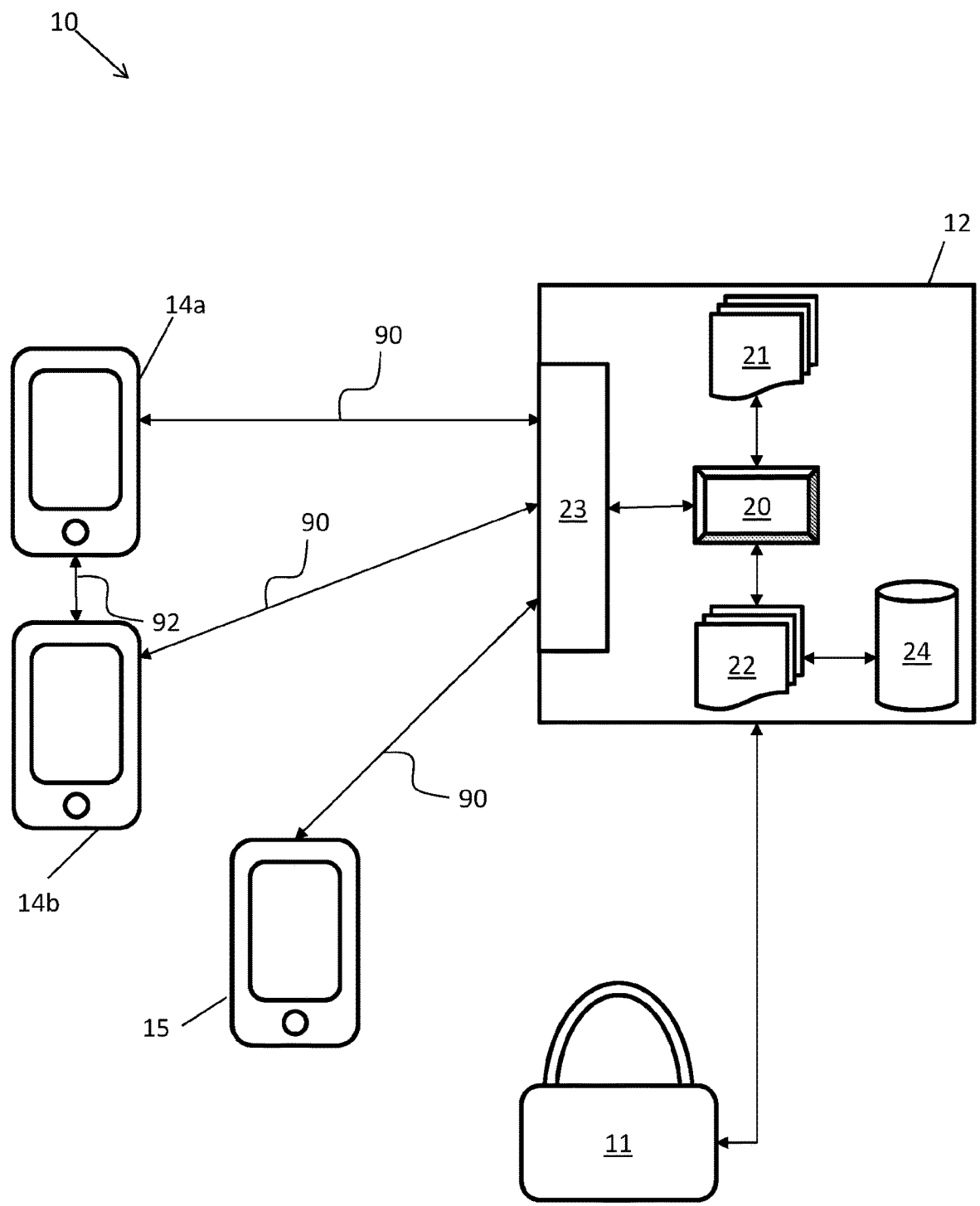
FIG. 1 shows a locking system according to an embodiment.

FIG. 1 shows a locking system 10. The locking system 10 comprises a lock 11 operatively interfaced with a lock controller 12, authorised devices 14 and unauthorised devices 15. Herein, authorised devices 14 and unauthorised devices 15 are collectively referred to as communication devices 14, 15. An authorised device 14 can be a verified device 14a or an unverified device 14b. The lock controller 12 is configured to communicate via a local wireless communication channel (local channel) 90 with the communication devices 14, 15. The authorised communication devices 14 are configured for communication via a data communication channel (data channel) 92 with one another, which can be local or not and may be wired and/or wireless. It is envisaged that the data communication channel 92 can utilise the same protocol as the local communication channel 90. Alternatively, the data communication channel 92 can utilise a different protocol to the local communication channel 90.

An "authorised device" herein refers to a communication device 14 which has been authorised by an authorised user of the locking system 10. An "unauthorised device" herein refers to a communication device 15 which has not been authorised by an authorised user. An "authorised device" can be a "verified authorised device" (for convenience, herein, reference is made to a "verified device") or an "unverified authorised device" (for convenience, herein, reference is made to an "unverified device"). An "unverified device" must undertake a verification procedure in order to become a "verified device".

Authorised devices 14 typically comprise portable computing devices, such as smartphones, which are configured for processing and storing data, and communicating data via one or more wireless interfaces. The portable computing devices can be configured for operation as an authorised device 14 through installation of appropriate software. It is envisaged that such software can be freely available from a suitable software repository; for example, as an "app" from an "app store". It will be clear to the person skilled in the art that alternative implementations of authorised devices 14 are possible. For example, it is envisaged that dedicated authorised devices 14, for example with a "dongle" form-factor comprising a microcontroller, can be utilised in the described system.

The lock controller 12 comprises a processor 20 interfaced with a program memory 21, a storage memory 22, and a network interface 23. The program memory 21 comprises program instructions configured to implement the functionality of the lock controller 12. The program instructions are optionally re-writable, for example, through a firmware update. The storage memory 22 is configured for storing data relating to the operation of the lock controller 12. The processor 20 is configured for maintaining a controller database 24 within the storage memory 22. The network interface 23 comprises at least a local wireless interface, such as Bluetooth Low Energy, ZigBee, Z-Wave, and any other suitable localised wireless communication protocol. The network interface 23 optionally also comprises a WAN wireless interface configured for communication with a wide-area network, such as the Internet, for example, a Wi-Fi interface (IEEE 802.11) and/or a 3g or 4g mobile network. Optionally, the network interface 23 comprises a wired network interface such as Ethernet. The controller database 24 is configured for storing information relating to authorised devices 14. The database 24 can also be configured for storing information relating to communication events between the lock controller 12 and communication devices 14, 15. The lock controller 12 can comprise, for example, one or more of: a Nordic Semiconductor nRF51822 or nRF52832 module; and an Insight SiP ISP130301 or ISP1507 module, or a Laird BL600 Series module. The lock controller 12 is typically located within a housing comprising the lock 11, but may be housed separately.

An authorised device 14 is configured to communicate with the lock controller 12 and, as a result of the lock controller 12 determining that the authorised device 14 is authorised, to cause operation of the lock 11 (typically unlocking of the lock 11). An unauthorised device 15 can also communicate with the lock controller 12, however, due to the lock controller determining that the unauthorised device 15 is not authorised, the lock controller 12 will not cause operation of the lock 11. In this sense, the lock controller 12 is configured to distinguish between authorised devices 14 and unauthorised devices 15, and to take different actions as a result.

Figure 2A:
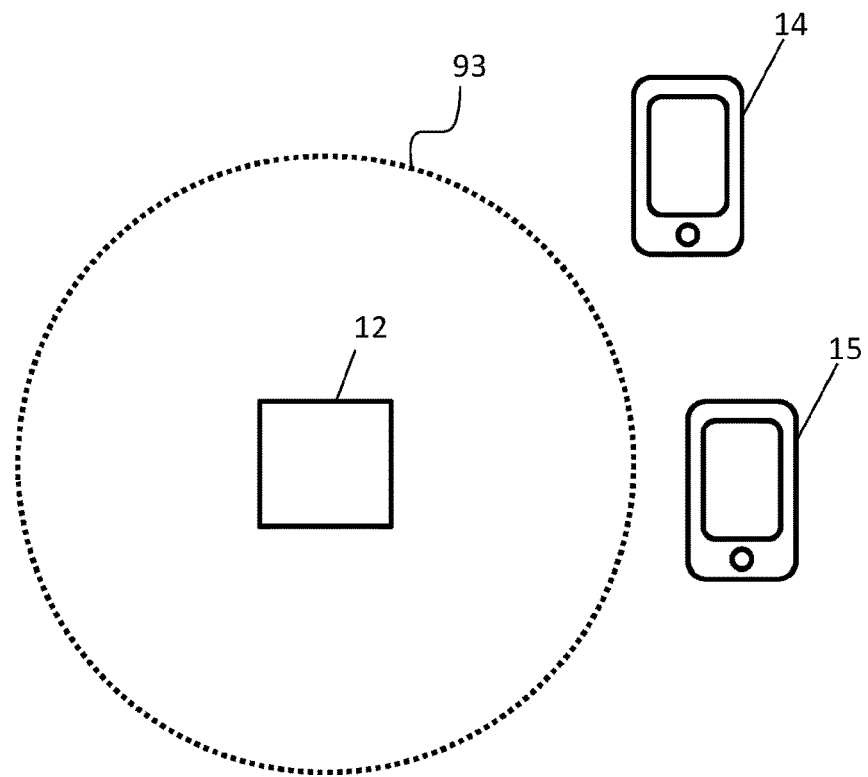
FIG. 2a shows an authorised device and an unauthorised device outside of a maximum distance from the lock controller.
Figure 2B:
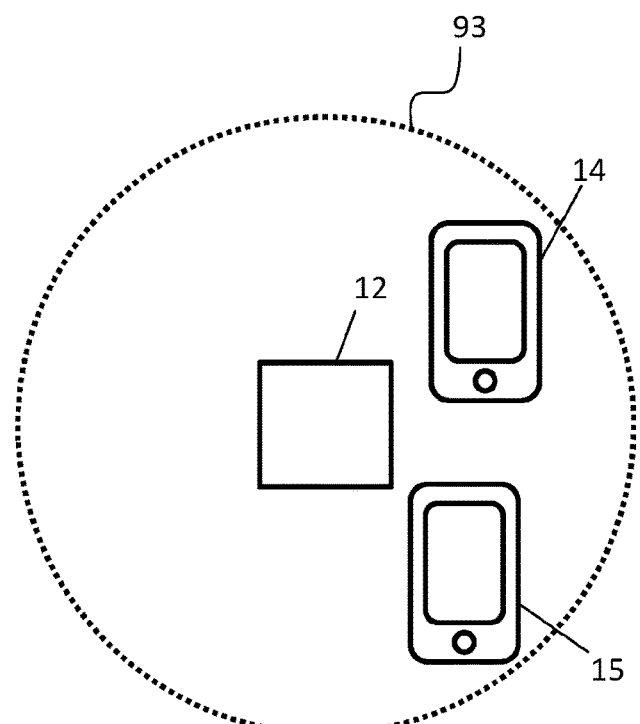
FIG. 2b shows an authorised device and an unauthorised device within a maximum distance from the lock controller.

A typical operation of the locking system 10 is shown in FIGS. 2a and 2b. The lock controller 12 is configured to cause an operation of the lock 11 (typically unlock the lock 11) in response to communication between an authorised device 14 and the lock controller 12. In FIG. 2a, an authorised device 14 is shown first at a distance from the lock controller 12 further than a maximum distance 93 for communication via the local channel 90 between the lock controller 12 and the authorised device 14. In order to cause the lock 11 to unlock, the authorised device 14 is brought within the maximum distance 93 of the lock controller 12, enabling communication via the local channel 90 between them. FIGS. 2a and 2b also show an unauthorised device 15 (first outside the maximum distance 93 in FIG. 2a and then within the maximum distance 93 in FIG. 2b).

The exact maximum distance 93 will depend on a number of local environmental factors in combination with the particular wireless communication standard corresponding to the local channel 90. However, for the purposes of this disclosure it is only necessary to consider an approximate maximum distance 93, which is typically less than 50 m, for example, 10 m. The approximate maximum distance 93 can be one specified by the wireless communication standard. For example, for Bluetooth Low Energy, the maximum distance 93 can be 10 m.

The lock controller 12 is associated with a lock ID, which typically is a randomly generated code such as a binary number. In binary, the lock ID is typically a binary number of at least 1024 bits. In a particular implementation, the lock ID is a binary number of 256 bytes. In another implementation, the lock ID is a binary number of 1 kB. The lock ID is typically set at manufacture of the lock 11 and cannot subsequently be changed. The lock ID is therefore effectively unique to the particular lock controller 12 and lock 11 to which it is associated.

A verified device 14a comprises data corresponding to the lock ID. This results from a previous communication between the lock controller 12 and the verified device 14a or between the verified device 14a and another, different, verified device 14a. An unauthorised device 15 does not comprise data corresponding to the lock ID. An unverified device 14b requires a verified device 14a to communicate the lock ID to it, and thereby become verified.

Figure 3A:
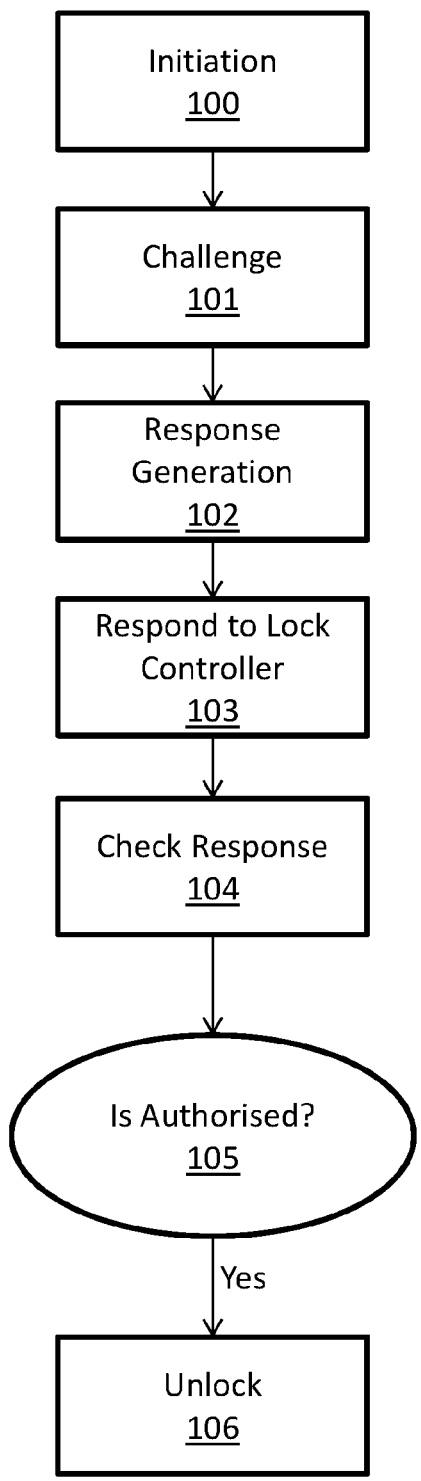
FIG. 3a shows a method of communication between a verified authorised device and the lock controller.
Figure 3B:
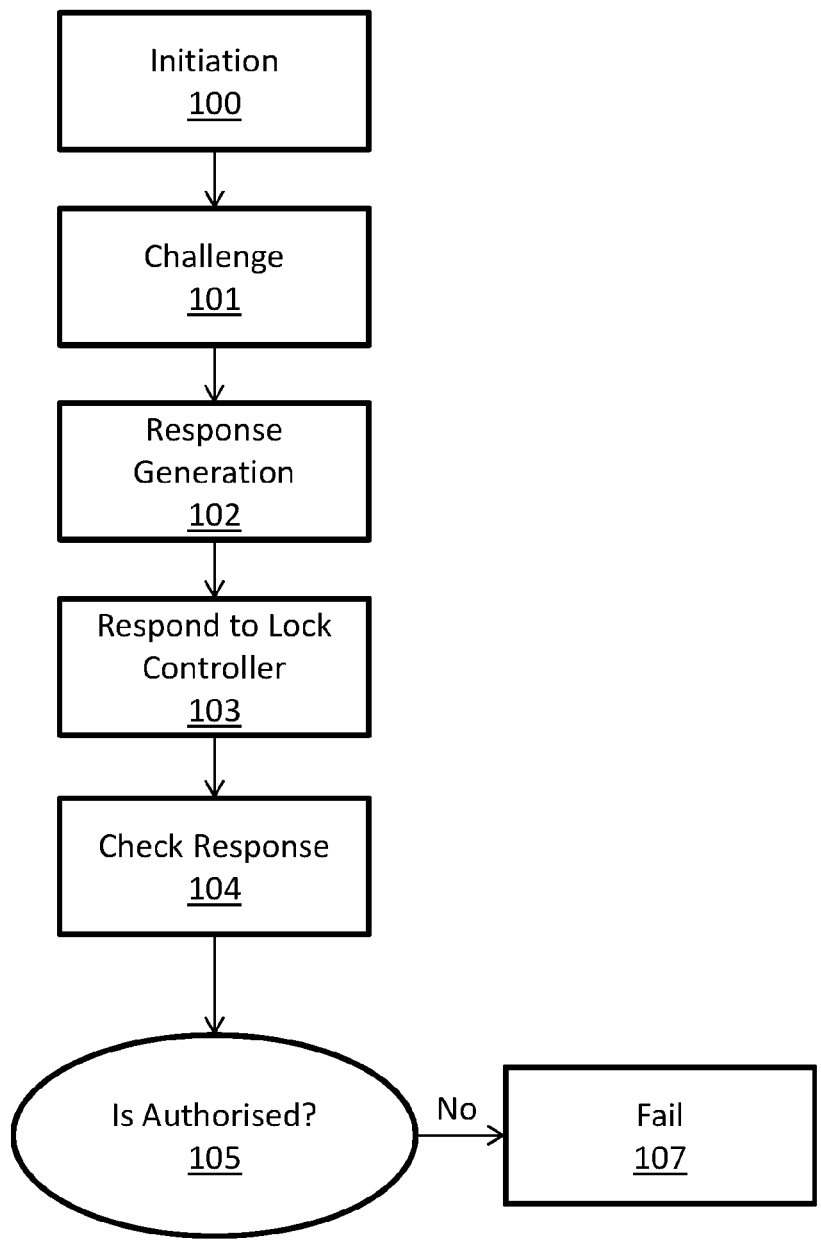
FIG. 3b shows a method of communication between an unauthorised device and the lock controller.

FIGS. 3a and 3b show methods in which the lock controller 12 communicates with different communication devices 14, 15. In FIG. 3a, communication is with a verified device 14a and in FIG. 3b communication is with an unauthorised device 15.

Referring to FIG. 3a, communication (via the local channel 90) between the lock controller 12 and the verified device 14a is initiated at initiation step 100, as a result of the verified device 14a coming within the maximum distance 93 of the lock controller 12. Either the lock controller 12 or the verified device 14a can initiate the communication. The communication is typically secure, for example, when the local channel 90 corresponds to the Bluetooth LE standard, the communication is secured according to AES-128 or AES-256 encryption.

The lock controller 12 issues a challenge to the verified device 14a at challenge step 101. The challenge comprises a randomly generated challenge key, for example, a 128 bit number.

The verified device 14a is configured to identify a response to the challenge based on the communicated challenge code and the lock ID already known to the verified device 14a, at response generation step 102. In an embodiment, the challenge key represents a set of 8-bit vectors (for example, a 128 bit key can comprise 16 8-bit vectors), and the response comprises a response key generated through selection of particular bytes of the lock ID specified by the vectors of the challenge key. The response key is then communicated to the lock controller 12 from the verified device 14a at response step 103.

The lock controller 12 compares the received response key to its own generated comparison key, at response check step 104. The comparison key is generated in the same manner as the response key (and is based on the lock ID and the same challenge key). Seeing as the lock controller 12 is in communication with a verified device 14a, the comparison key and the response key will be identical (on account of both the lock controller 12 and the verified device 14a knowing the same lock ID), therefore the response is a correct response. Therefore, the result of authorisation check step 105 is progression to unlock step 106.

At unlock step 106, the lock controller 12 operates the lock 11 (typically this corresponds to causing the lock 11 to unlock).

Referring now to FIG. 3b, communication between the lock controller 12 and the unauthorised device 15 is initiated at initiation step 100, as a result of the unauthorised device 15 coming within the maximum distance 93 of the lock controller 12. Similar to the method of FIG. 3a, in response the lock controller 12 issues a challenge at challenge step 101.

The unauthorised device 15 does not comprise data relating to the lock ID. Therefore, the unauthorised device 15 is effectively unable to provide the correct response to the challenge at response step 103. The unauthorised device 15 may simply not respond to the challenge, in which case the process ends before response step 103. However, should the unauthorised device 15 respond to the challenge, it will generate a response (i.e. a response key) at response generation step 102. The response can be of an appropriate data length; however, as the unauthorised device 15 does not know the lock ID, it is unable to determine the correct response.

The lock controller 12 receives the response key from the unauthorised device 15 at response step 103. It then generates a comparison key as previously described at response check step 104. However, the comparison between the response key and the comparison key will determine that the response key and the comparison key are different (a "fail event"). Thus, the result of authorisation check step 105 is progression to fail step 107.

Fail step 107 can simply correspond to no further activity. However, the lock controller 12 can be configured to undertake further actions. One further action is to record the fail event within the database 24 as a data entry, optionally with additional information such as any data relating to the unauthorised device 15 that may have been acquired (e.g. MAC address, phone number where applicable, etc.) and/or information related to the time and date of the fail event. Another further action is to communicate to the unauthorised device 15 that the fail event has occurred.

Generally, the response key will be different every time a challenge is issued by the lock controller 12, as the challenge key is randomly generated for each challenge. Therefore, even if an unauthorised user were to monitor communications between the lock controller 12 and verified devices 14a, the unauthorised user will be unable to ascertain a response key that can be used at a later point in time to allow an unauthorised device 15 to undertake communications as if it were authorised device 14.

Figure 4A:
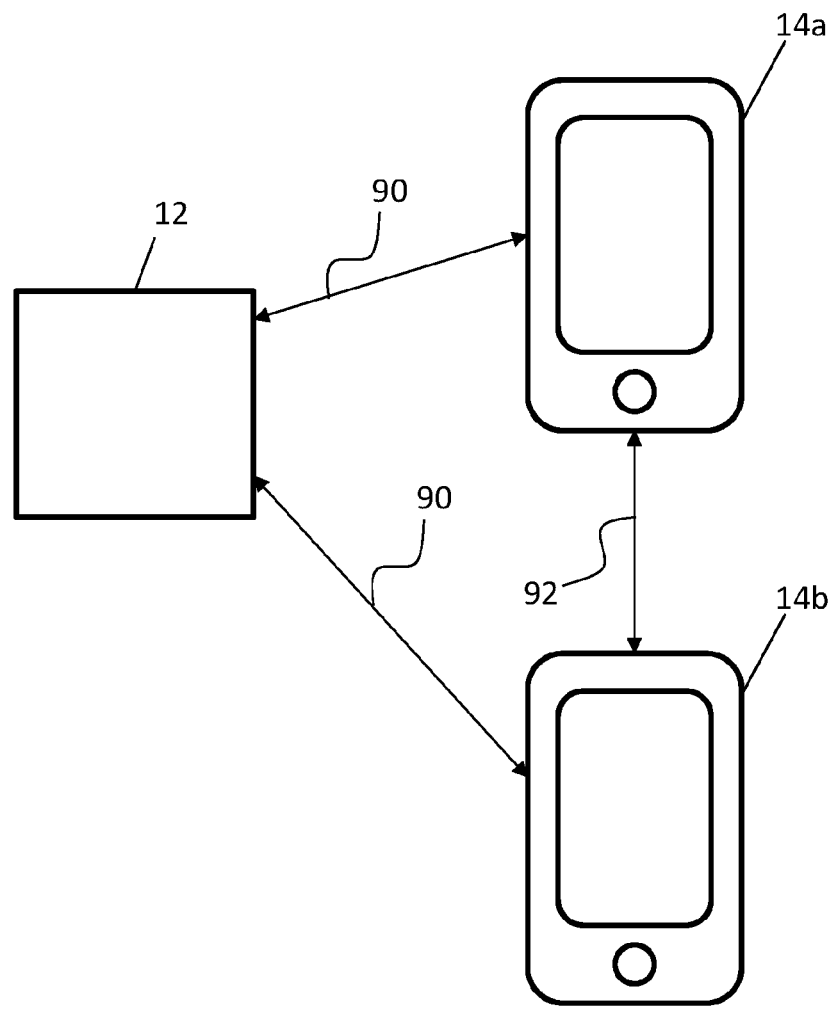
FIG. 4a shows a lock controller, verified device, and unverified device configured for device verification.
Figure 4B:
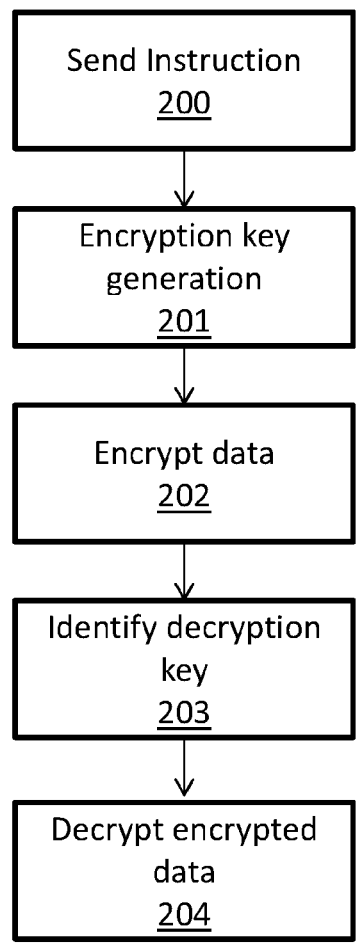
FIG. 4b shows a method of device verification.

In order to utilise an unverified device 14b to operate the lock 11 (via the lock controller 12), it is necessary to verify the unverified device 14b (thereby resulting in it becoming a verified device 14a). This is referred to as "device verification". Device verification according to an embodiment is shown in FIGS. 4a and 4b. According to the embodiment, device verification is facilitated by a verified device 14a. Generally, a verified device 14a is one that can respond to the challenge made by the lock controller 12, and therefore, a verified device 14a knows the lock ID of the lock controller 12. The process of device verification typically involves the unverified device 14b obtaining the lock ID.

FIG. 4a shows a verified device 14a, an unverified device 14b, and a lock controller 12. The lock controller 12 is configured for communication via the local channel 90 with both the verified device 14a and the unverified device 14b (the communication with the verified device 14a can occur at a different time to the communication with the unverified device 14b). The verified device 14a is configured for communication via the data channel 92 with the unverified device 14b. The data channel 92 can be a one-way or two-way channel, and typically involves wireless data communication. The data channel 92 is one that does not require proximity between the verified device 14a and the unverified device 14b. For example, the data communication channel 92 can be 3G or 4G communication, such as MMS, or a channel utilising the Internet to enable communication between the verified and unverified devices 14a, 14b.

Figure 4C:
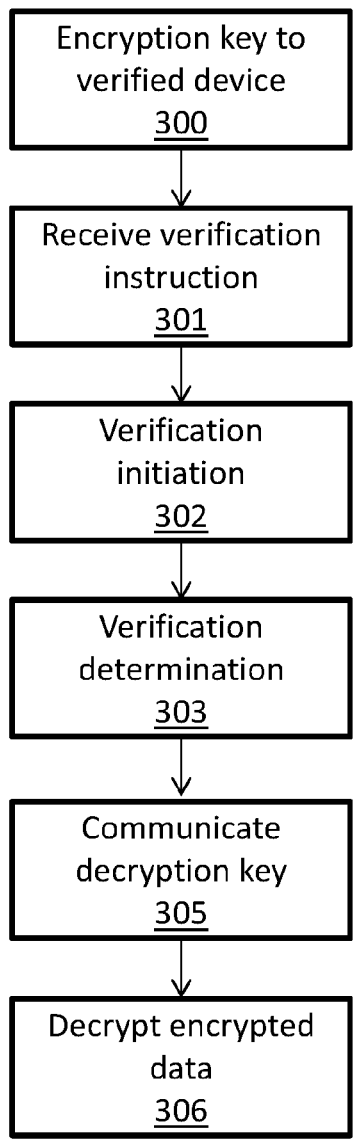
FIG. 4c shows another method of device verification.

Referring now to FIGS. 4b and 4c, methods are shown by which the unverified device 14b obtains the lock ID. The lock ID is communicated from the verified device 14a to the unverified device 14b as encrypted data, and the unverified device 14b subsequently obtains a decryption key for decrypting the encrypted data thereby obtaining the lock ID. FIG. 4b shows a method of identifying the decryption key based on information provided by the verified device 14a. FIG. 4c shows a method of identifying the decryption key utilising communication with the lock controller 12.

Referring to FIG. 4b, an authorised user instructs the verified device 14a to undertake actions necessary for device verification of an unverified device 14b, at instruction step 200.

In response, the verified device 14a generates encrypted data using the encryption key at encryption key generation step 201. The encryption key is generated in accordance with at least one of (and typically at least two of): information relating to the lock controller 12 (lock parameter(s)); information relating to the verified device 14a (verified device parameter(s)), and information relating the unverified device 14b (unverified device parameter(s)). The encryption key is generated according to pre-defined rules based on the lock parameter(s) and/or verified device parameter(s) and/or unverified device parameter(s).

In an embodiment, the lock controller 12 is associated with a publically known public ID. The encryption key is then generated in accordance with the public ID and at least one verified device parameter and/or at least one unverified device parameter. It is envisaged that when the verified device 14a and unverified device 14b are phones (such as smartphones), the encryption key can be generated in accordance with the public ID, the phone number of the verified device 14a (being a verified device parameter), and the phone number of the unverified device 14b (being an unverified device parameter).

The verified device 14a then generates encrypted data at encryption step 202. The encrypted data comprises at least the lock ID, which is encrypted using the encryption key. The encrypted data is then communicated to the unverified device 14b via the data communication channel 92, and is stored in a memory of the unverified device 14b.

The unverified device 14b then identifies the decryption key suitable for decrypting the encrypted data based on the same parameters utilised in creating the encryption key, at decryption key identification step 203. It is understood that the encryption key and decryption key can be the same. In implementations where the encryption key is generated in accordance with one or more lock parameters and/or one or more verified device parameters, these can be communicated to the unverified device 14b from the verified device 14a. It is anticipated that at least one parameter can be user inputted.

In an embodiment, the encrypted data is sent from a verified device 14a being a smartphone to the unverified device 14b being another smartphone as a file, optionally with a file name derived from the public ID. The verified device 14a also communicates one or more of its phone number; MAC address; SIM identification; or any other data suitable for identifying the verified device 14a to the unverified device 14b. The unverified device 14b is thereby able to generate the decryption key in accordance with the public ID, the identification of the verified device 14a (for example, this may be the phone number or the MAC address of the verified device 14a), and the phone number of the unverified device 14b.

Next, the unverified device 14b decrypts the encrypted data using the decryption key, at decryption step 204. The unverified device 14b is then able to identify and store within a persistent memory of the unverified device 14b the lock ID. The verified device 14b is now effectively verified; the unverified device 14b becomes a verified device 14a, and is able to unlock the lock as previously described with reference to FIG. 3a.

Referring to FIG. 4c, the lock controller 12 communicates an encryption key to the verified device 14a at initial step 300. The encryption key is associated with a decryption key which is suitable for decrypting data encrypted by the encryption key. The encryption key can be a public key and the decryption key a private key of a public key encryption system. Alternatively, the encryption and decryption keys can be those of a symmetric key encryption system. Generally, the encryption key and decryption key can be keys of any suitable encryption system. The verified device 14a typically will store the encryption key in an internal memory.

An authorised user then instructs the verified device 14a to undertake actions necessary for device verification of an unverified device 14b, at instruction step 301. Instruction step 301 and initial step 300 can be undertaken due to a single instruction or different instructions of an authorised user or users. In response, the verified device 14a generates encrypted data using the encryption key. The encrypted data comprises lock ID. According to an embodiment, the encrypted data also comprises information relating to the verified device 14a (verified device parameter(s)). Verified device parameter(s) comprise information unique to the verified device 14a. Examples include phone number (where a smartphone); MAC address; SIM identification (where a smartphone comprising a SIM); or any other data suitable for identifying the verified device 14a. Typically, the verified device parameter(s) correspond to data stored in the database 24 of the lock controller 12 associated with the particular verified device 14a.

The encrypted data is then communicated to the unverified device 14b via the data channel 92, and is stored in a memory of the unverified device 14b.

The unverified device 14b is then brought within the maximum distance 93 of the lock controller 12, initiating communication via the local channel 90 between the unverified device 14b and the lock controller 12 at verification initiation step 302. The lock controller 12 determines, through communication with the unverified device 14b, that the unverified device 14b requires device verification, at verification determination step 303. This can be achieved, for example, simply by the unverified device 14b communicating that it requires device verification to the lock controller 12.

The lock controller 12 then communicates to the unverified device 14b the decryption key associated with the encryption key at decryption key communication step 305. The communication will typically be via the local channel 90, and will typically be encrypted such as with the AES-128 or AES-256 encryption already mentioned.

Using the decryption key, the unverified device 14b decrypts the encrypted data and thereby obtains the lock ID, at decryption step 306. The unverified device 14b is now effectively verified; the unverified device 14b becomes a verified device 14a, and is able to unlock the lock as previously described with reference to FIG. 3a.

According to an embodiment, the lock controller 12 is configured for maintaining, within database 24, data entries relating to one or more verified devices 14a, optionally all verified devices 14a. For example, during device verification, the unverified device 14b communicates to the lock controller one or more device parameters of the unverified device 14b which are recorded in addition to the unverified device 14b becoming verified. Alternatively, at first instance of a verified device 14a communicating with the lock controller 12, the verified device 14a is configured to communicate to the lock controller 12 the one or more device parameters associated with it. The one or more device parameters include information suitable for identifying (and therefore distinguishing) the authorised device 14 from other authorised devices 14. Such parameters include: phone number (where a smartphone); MAC address; SIM identification (where a smartphone comprising a SIM); or any other data suitable for identifying the verified device 14a.

According to an embodiment, the database 24 can also be configured to maintain data entries relating to limitations of verified devices 14a. Limitations include, for example: a limited number of lock operations; a limited time period of lock operations; and/or limited times for lock operations. When a verified device 14a communicates the encrypted data to an unverified device 14b, it can communicate "limitation parameters" specifying which limitations are to be associated with the unverified device 14b (which can also be encrypted) to the unverified device 14b. Once verified, or during verification, the unverified device 14b is required to communicate the limitation parameters to the lock controller 12, which then records these parameters within the database as a data entry associated with the unverified device 14b.

In the case of a limited number of lock operations, a verified device 14a can be limited to a set number of operations of the lock 11, for example, one operation. The lock controller 12 is required to maintain a data entry associated with the a verified device 14a specifying the maximum number of lock operations and a data entry associated with the verified device 14a specifying the current number of lock operations effected by the authorised device 14. Once these two data entry comprise the same values, the lock controller 12 is configured to disallow (ignore) any further lock operation due to the verified device 14a. The verified device 14a is not an unauthorised device 15 at this point as it still comprises the lock ID.

In the case of a limited time period of lock operations, a verified device 14a can be limited to being able to cause lock operations for a certain amount of time after it is first verified or it first causes a lock operation ("originating event"). The lock controller 12 is required to maintain a data entry associated with the verified device 14a specifying the amount of time from the originating event and a data entry specifying the time of the originating event. Once the current time exceeds the specified time from the originating event, no further lock operations will occur due to the verified device 14a.

In the case of limited times for lock operations, a verified device 14a can be limited to only causing lock operations at specified times. These times may be "one-off" or periodic. For example, a specified time might be specific hours on a specific day (this is a "one-off" situation). Another example, a specified time might be every Monday (this is a "periodic" situation). The lock controller 12 is required to maintain a data entry associated with the verified device 14a specifying the times at which lock operations are allowed. Lock operations will therefore only be effected by the verified device 14a within the specified times.

Figure 5A:
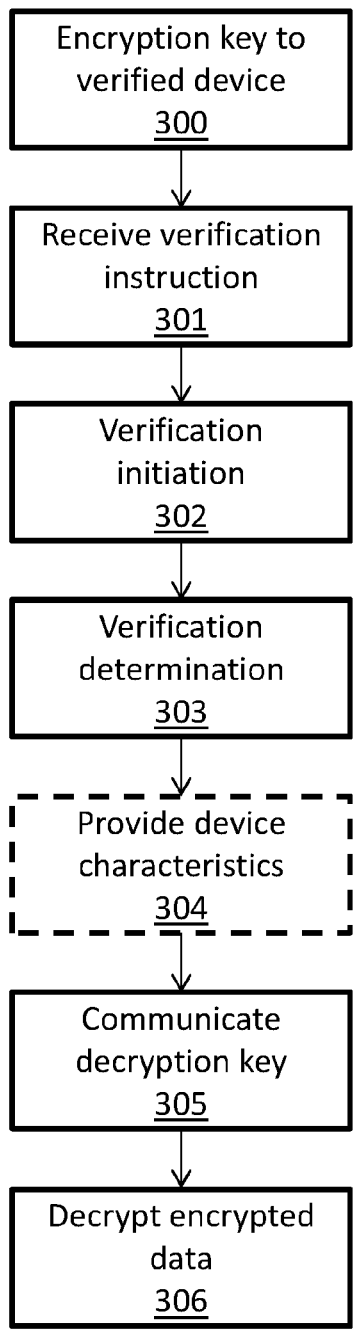
FIGS. 5a and 5b show methods comprising an optional step of providing device characteristics to the lock controller.
Figure 5B:
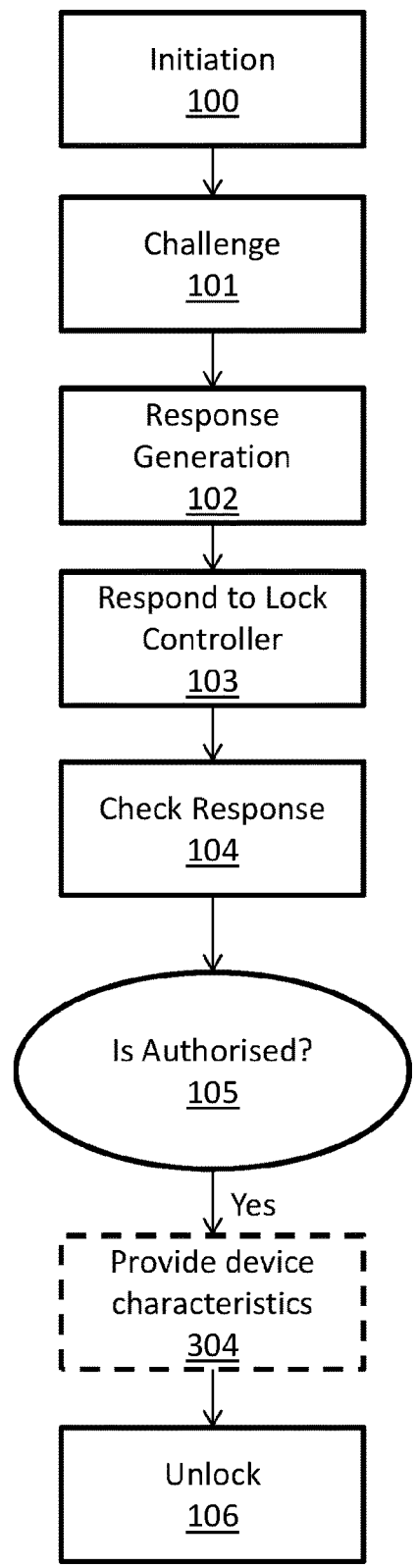

In an embodiment, each verified device 14a is associated with one or more pre-defined permissions. Typically, the database 24 of the lock controller 12 comprises data entry specifying one or more permissions of each verified device 14a. In one implementation, there are two permissions levels associated with a particular permission: administrators; and normal. It is only verified devices 14a that are administrators that have permission to cause verification of an unverified device 14b. Referring to FIGS. 5a and 5b, modifications of the methods of FIGS. 4b and 4c (respectively) are shown. The lock controller 12 requires the unverified device 14b to provide information that the verified device 14a which provided the encrypted data has permission to do so; that is, that the verified device 14a is an administrator. The unverified device 14b may therefore provide the one or more device characteristics of the verified device 14a provided along with the encrypted data to the lock controller 12. This can be done, for example, during device verification (e.g. as shown in FIG. 5a) or during the first communication between a verified device 14a and the lock controller 12 (the first communication after an unverified device 14b has been verified), as shown in FIG. 5b at optional device characteristic step 304. The lock controller 12 then compares the received one or more device characteristics to the database 24 in order to determine the permission level of the verified device 14a. The lock controller 12 then only continues to decryption key communication step 305 if it determines the verified device 14a has the necessary permission.

In embodiments utilising device parameters and/or limitations, it may be advantageous to utilise a different encryption key (and corresponding decryption key) to that utilised to encrypt the lock ID. For example, a secondary encryption key and secondary decryption key can be utilised that is only known to verified devices 14a with correct permission level (e.g. administrator) and the lock controller 12. This can be beneficial as this data cannot be modified by the unverified device 14b after it obtains the decryption key. The lock controller 12 can be configured for communicating the secondary key(s) to verified devices 14a associated with the correct permission.

In an embodiment, the first authorised device 14 to communicate with the lock controller 12 after an initialisation of the lock controller 12 (e.g. after installation) is automatically made a verified device 14a, and is communicated the lock ID directly. Where applicable, this first verified device 14a should have no limitations and "full" permissions (e.g. should be set as an administrator device).

In an embodiment, the lock controller 12 is configured for providing data from the database 24 to a suitably configured data receiver. The data receiver can be a verified device 14a, in particular where applicable, with administrator permission. The data can then be processed and displayed by the data receiver. Typically, the data is transferred via the local wireless communication channel 90.

In an embodiment, the encrypted data is sent as an image via the MMS protocol (corresponding to data channel 92). This can be advantageous as it utilises an entirely different communication means to the local wireless communication channel 90. In order to provide the encrypted data, a pre-generated image is modified according to known steganographic techniques in order to conceal the encrypted data within it. The encrypted data may be encrypted before being concealed within the image or the act of concealing the image may constitute the encryption. The unverified device 14b is then configured to obtain the encrypted data from the image after receiving the image via MMS and the decryption key from the lock controller 12.

In an embodiment, encrypted specified information on the unverified device 14b is communicated to the unverified device 14b from the verified device 14a, typically encrypted with a different key to the lock ID. For example, the specified information can comprise: a phone number of the unverified device 14b (where a smartphone); a MAC address; SIM identification (where a smartphone comprising a SIM); or any other data suitable for identifying the unverified device 14b. This encrypted specified information is provided to the lock controller 12 by the unverified device 14b during device verification or during its first communication with the lock controller 12 after being verified. The lock controller 12 then decrypts the specified information and stores it as a data entry of the database 24.

According to this embodiment, when a verified device 14a communicates with the lock controller 12 (such as according to FIG. 3a) in order to cause operation of the lock 11, the lock controller 12 requests information from the verified device 14a equivalent to the specified information. The lock controller 12 is configured to only allow operation of the lock 11 by verified devices 14a in which the received information matches the specified information stored within the database 24. This is advantageous, as it can help protect against unauthorised devices 15 mimicking verified devices 14a.

In an embodiment, verified devices 14a (in particular, where applicable, those with a suitable permission such as "administrator") are configured to modify data entries of the database 24 through communication with the lock controller 12. In particular, the administrator verified device 14a can cause another verified device 14a to be disallowed from causing lock operations. Similarly, the administrator verified device 14a can be configured to simply remove all entries related to another verified device 14a (or even itself), thereby effectively converting the verified device 14a into an unverified device 14b or even an unauthorised device 15.

It will be understood to persons skilled in the art of the invention that many modifications may be made without departing from the spirit and scope of the invention.

The invention claimed is:
1. A method for an authorised device to effect unlocking of a lock, wherein the authorised device is initially an unverified device, the method comprising:
 a lock controller operatively interfaced to the lock communicating to a verified device a lock ID of the lock controller via a local communication channel;
 the verified device generating encrypted data comprising the lock ID;
 the verified device communicating the encrypted data to the authorised device via a data communication channel;
 the authorised device obtaining a decryption key for decrypting the encrypted data, wherein the authorized device determines two or more parameters related to the encrypted data, and obtains the decryption key by combining the two or more parameters;
 the authorised device determining the lock ID by decrypting the encrypted data using the decryption key;
 the authorised device generating with the lock ID a response to a challenge by the lock controller;

the lock controller determining that the response is a correct response; and in response to determining that the response to the challenge is correct, the lock controller causing unlocking of the lock.

2. A method as claimed in claim 1 wherein the local communication channel is one of: Bluetooth Low Energy, ZigBee, Z-Wave, or any other suitable local wireless communication protocol.

3. A method as claimed in claim 1, wherein the local communication channel has a range of less than or equal to approximately 50 metres.

4. A method as claimed in claim 1, wherein the local communication channel is equal to or less than approximately 10 metres.

5. A method as claimed in claim 1, wherein the lock controller comprises a database, the database configured for storing data entries relating to verified devices.

6. A method as claimed in claim 5, further comprising the step of storing a data entry within the database associated with the verified device specifying that the verified device has permission to communicate the lock ID to the authorised device.

7. A method as claimed in claim 6, further comprising the step of storing a data entry associated with the authorised device specifying one or more limitations associated with the authorised device, said one or more limitations specifying restrictions on the authorised device effecting unlocking of the lock.

8. A method as claimed in claim 1, wherein the challenge comprises communicating a challenge key comprising a set of vectors, and the response comprises a response key generated from the lock ID in accordance with the challenge key.

9. A method as claimed in claim 1 further comprising the steps of:
the verified device communicating one or more device parameters of the verified device to the authorised device via the data communication channel;
the authorised device communicating the one or more device parameters of the verified device to the lock controller via the local communication channel; and
the lock controller determining that the one or more device parameters are associated with a verified device entitled to communicate the lock ID.

10. A method as claimed in claim 9, wherein the one or more device parameters of the verified device are encrypted using a secondary encryption key by the verified device, and further comprising the step of the lock controller decrypting the one or more device parameters using a secondary decryption key.

11. A method as claimed in claim 1, wherein the authorised device obtains the decryption key from the lock controller via the local communication channel.

12. A method as claimed in claim 1, wherein at least one parameter of the two or more parameters is a public ID of the lock controller and wherein at least one other parameter is a verified device parameter associated with the verified device or an unverified device parameter associated with the authorised device.

13. A method as claimed in claim 1, wherein when the authorized device determines more than two parameters, the two or more parameters include a public ID of the lock controller, a verified device parameter associated with the verified device, and an unverified device parameter associated with the authorised device.

14. A locking system comprising:
a plurality of authorised devices comprising:
one or more verified devices and
one or more unverified devices, and
a lock controller operatively interfaced with a lock and configured to cause unlocking of the lock,
wherein the authorised devices are configured for communication with the lock controller via a local communication channel and
wherein the authorised devices are configured for communicating with one another via a data communication channel,
wherein:
at least one verified device is configured to receive a lock ID from the lock controller via the local communication channel;
the one or more unverified devices are configured to receive from a verified device having the lock ID encrypted data comprising the lock ID;
the one or more unverified devices are configured to:
determine two or more parameters related to the encrypted data and obtain a decryption key by combining the two or more parameters;
decrypt received encrypted data to thereby obtain the lock ID;
generate a response in accordance with the lock ID and a challenge key received from the lock controller via the local communication channel; and
communicate the response to the lock controller;
the lock controller configured to identify a correct response when a response is received from at least one of the one or more unverified devices and cause unlocking of the lock in response to determining that the response generated in accordance with the challenge key is correct.

15. A system as claimed in claim 14, wherein the lock controller comprises a processor, a storage memory, and a network interface, and is associated with a lock ID, wherein the processor is configured to enable the lock controller to:
maintain a database within the storage memory, the database comprising data entries associated with one or more verified devices;
receive a first communication from a verified device, and in response, to receive from the verified device one or more device parameters associated with the verified device; and
to store within the database a data entry associated with the verified device including the one or more device parameters.

16. A system as claimed in claim 15, wherein the processor is further configured to enable the lock controller to: communicate to a verified device the lock ID.

17. A system as claimed in claim 15, wherein the processor is further configured to enable the lock controller to:
randomly generate a challenge key;
communicate the challenge comprising a challenge key to a verified device; receive from the verified device a response to the challenge comprising a response key;
generate a comparison key in accordance with the lock ID and the challenge key; and
to determine whether the comparison key is the same as the response key, and when so, to cause unlocking of the lock.

18. A system as claimed in claim 17, where the processor is further configured to enable the lock controller to:
maintain within the database limitation information for the verified devices; and to determine whether a verified device communicating with the lock controller meets the requirement of an associated limitation, and to only unlock the lock when said requirement is met.

19. A method for an authorised device to effect unlocking of a lock, wherein the authorised device is initially an unverified device, the method comprising:

a lock controller operatively interfaced to the lock communicating to a verified device a lock ID of the lock controller via a local communication channel;

the authorised device receiving from the verified device encrypted data comprising the lock ID;

the authorised device obtaining a decryption key for decrypting the encrypted data, wherein the authorized device determines two or more parameters related to the encrypted data, and obtains the decryption key by combining the two or more parameters;

the authorised device determining the lock ID by decrypting the encrypted data using the decryption key;

the authorised device generating with the lock ID a response to a challenge by the lock controller;

the lock controller determining that the response is a correct response; and in response to determining that the response to the challenge is correct, the lock controller causing unlocking of the lock.

* * * * *